United States Patent
Ho

(10) Patent No.: US 7,810,934 B2
(45) Date of Patent: Oct. 12, 2010

(54) PROJECTION DEVICE HAVING A BUILT-IN ADJUSTMENT MECHANISM

(75) Inventor: Wen-Ching Ho, Hsinchu (TW)

(73) Assignee: Coretronic Corporation, Hsinchu (TW)

( * ) Notice: Subject to any disclaimer, the term of this patent is extended or adjusted under 35 U.S.C. 154(b) by 844 days.

(21) Appl. No.: 11/655,967

(22) Filed: Jan. 22, 2007

(65) Prior Publication Data

US 2007/0229782 A1 Oct. 4, 2007

(30) Foreign Application Priority Data

Mar. 28, 2006 (TW) .............................. 95110709 A

(51) Int. Cl.
G03B 21/14 (2006.01)
G03B 21/22 (2006.01)
G02B 7/02 (2006.01)

(52) U.S. Cl. ..................... 353/119; 353/101; 359/808; 359/813; 359/819

(58) Field of Classification Search .................. 353/119, 353/100–101; 359/808, 811, 813, 815, 819
See application file for complete search history.

(56) References Cited

U.S. PATENT DOCUMENTS

| 5,895,110 | A | 4/1999 | Okada et al. |
| 6,364,491 | B1 * | 4/2002 | Okada et al. ................. 353/101 |
| 6,499,849 | B1 | 12/2002 | Huang |
| 6,661,588 | B1 | 12/2003 | Huang et al. |
| 6,738,198 | B2 * | 5/2004 | Kashiwaba et al. .......... 359/704 |
| 2005/0117127 | A1 * | 6/2005 | Jang ............................ 353/100 |
| 2006/0050252 | A1 | 3/2006 | Hsu et al. |
| 2006/0092384 | A1 * | 5/2006 | Kuroda ......................... 353/69 |
| 2006/0256303 | A1 * | 11/2006 | Hamada ....................... 353/101 |

FOREIGN PATENT DOCUMENTS

| CN | 1188370 | | 7/1998 |
| JP | 60051089 | A * | 3/1985 |
| TW | 399163 | | 7/2000 |
| TW | I246604 | | 1/2006 |

* cited by examiner

*Primary Examiner*—Georgia Y Epps
*Assistant Examiner*—Magda Cruz
(74) *Attorney, Agent, or Firm*—Rosenberg, Klein & Lee

(57) ABSTRACT

A projection device, having an optical engine device and an adjusting device is provided. The optical engine device has an optical engine and a fixing device coupled to the optical engine. A first thread hole is formed in the optical engine along a Z-axis direction. An image is projected parallel to the Z-axis. The adjusting device further has an adjusting frame in which a second thread hole is formed along the Z-axis direction and an adjusting bolt screws through the second thread hole and the first thread hole. The operation of the adjusting bolt, the fixing device as well as the optical engine is moved relatively to the adjusting frame along the Z-axis. Thereby, the optical engine has a built-in adjustment mechanism to ensure the focal length maintained as the design value after assembly, such that the image quality of the projection device is enhanced.

10 Claims, 6 Drawing Sheets

PROJECTION DEVICE HAVING A BUILT-IN ADJUSTMENT MECHANISM

BACKGROUND OF THE INVENTION

1. Field of the Invention

The present invention relates to a projection device, particularly to a projection device of which the position of the optical engine can be adjusted so that focusing error can be improved and the quality of projected images can be enhanced.

2. Description of the Related Art

Referring to FIG. 1, a conventional projection device 90 has an optical engine 91, which is fixed to a base 92 and projects images to a reflection mirror or screen 93. The optical engine 91 is a high-precision instrument and has a specific design value of focal length. However, mechanical errors, assemblage errors, optical errors and transportation factors often cause the optical engine 91 moved along the Z-axis, that is the projection direction of the image. Consequent, the resulting focal length is deviated from the design value, which results in blurred images. Although an additional adjustment mechanism is available to adjust the focal length after the optical engine 91 is assembled, an adequate adjustment cannot be obtained because the optical engine 91 is fixed on the base 92. Therefore, the focal length of image projection along the Z-axis is still beyond the design value, which seriously affects the image quality. Therefore, how to design a projection device with the function of built-in focal-length adjustment mechanism, so as to ensure the image quality has become an important research subject in the field concerned.

In view of the problem that the conventional projection device lacks the adequate adjustment function of optical engine and in order to serve the society and advance the industry, a solution has been studied and sought. After years of studying, an adjustment mechanism for optical engine which has superior adjustability and operational convenience has been developed.

SUMMARY OF THE INVENTION

A projection device incorporating a built-in adjustment mechanism for the optical engine is provided. The built-in adjustment mechanism for the optical engine ensures that the focal length of the optical engine remains within the design value after the optical engine is assembly, such that the image quality of the projection device can be enhanced.

The projection device as provided includes an optical engine that has a superior performance and great convenience in focal length adjustment and has high efficiency in assembling.

By providing the position-adjustment function of the optical engine, the convenience of focal length adjustment in assembling the optical engine is obtained and the overall image quality of the projection device is enhanced.

The projection device comprises an optical engine device and an adjusting device. The optical engine device includes an optical engine and a fixing device. The fixing device has a first thread hole disposed along the Z-axis, an adjusting frame including a second thread hole formed along the Z-axis, and an adjusting bolt is screwing to both the first and second thread holes. The fixing device of the optical engine is coupled to the adjusting frame. By operating the adjusting bolt, the fixing device and the optical engine are moved relative to the adjusting frame along the Z-axis.

In order to enable the technical characteristics and efficacy of the present invention to be more easily understood, the preferred embodiments of the present invention are to be described in detail in cooperation with the attached drawings below.

DETAILED DESCRIPTION OF THE INVENTION

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. In addition, the terms "connected" and "coupled" and variations thereof are not restricted to physical or mechanical connections or couplings.

Figure 1:
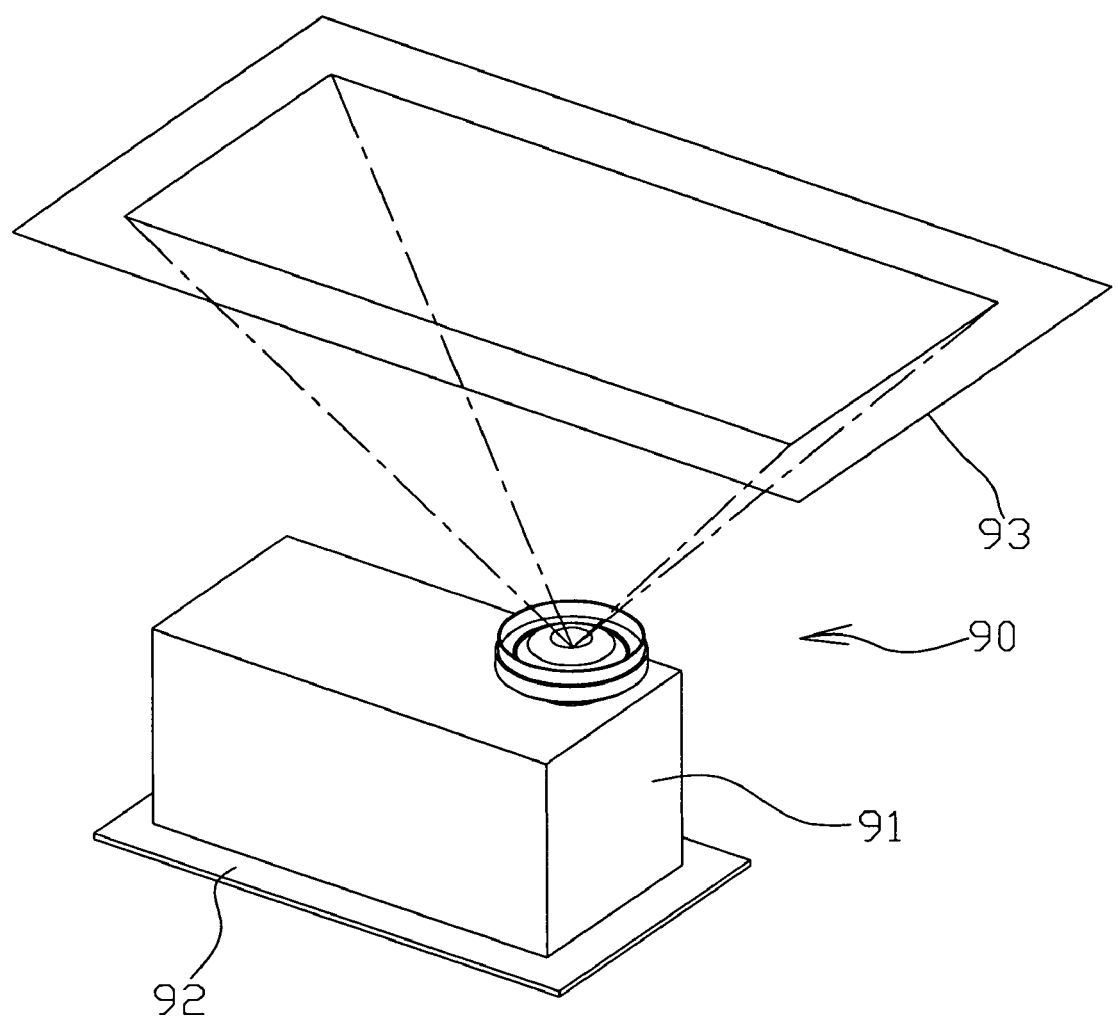
FIG. 1 is a schematic diagram showing a conventional optical engine.
Figure 2:
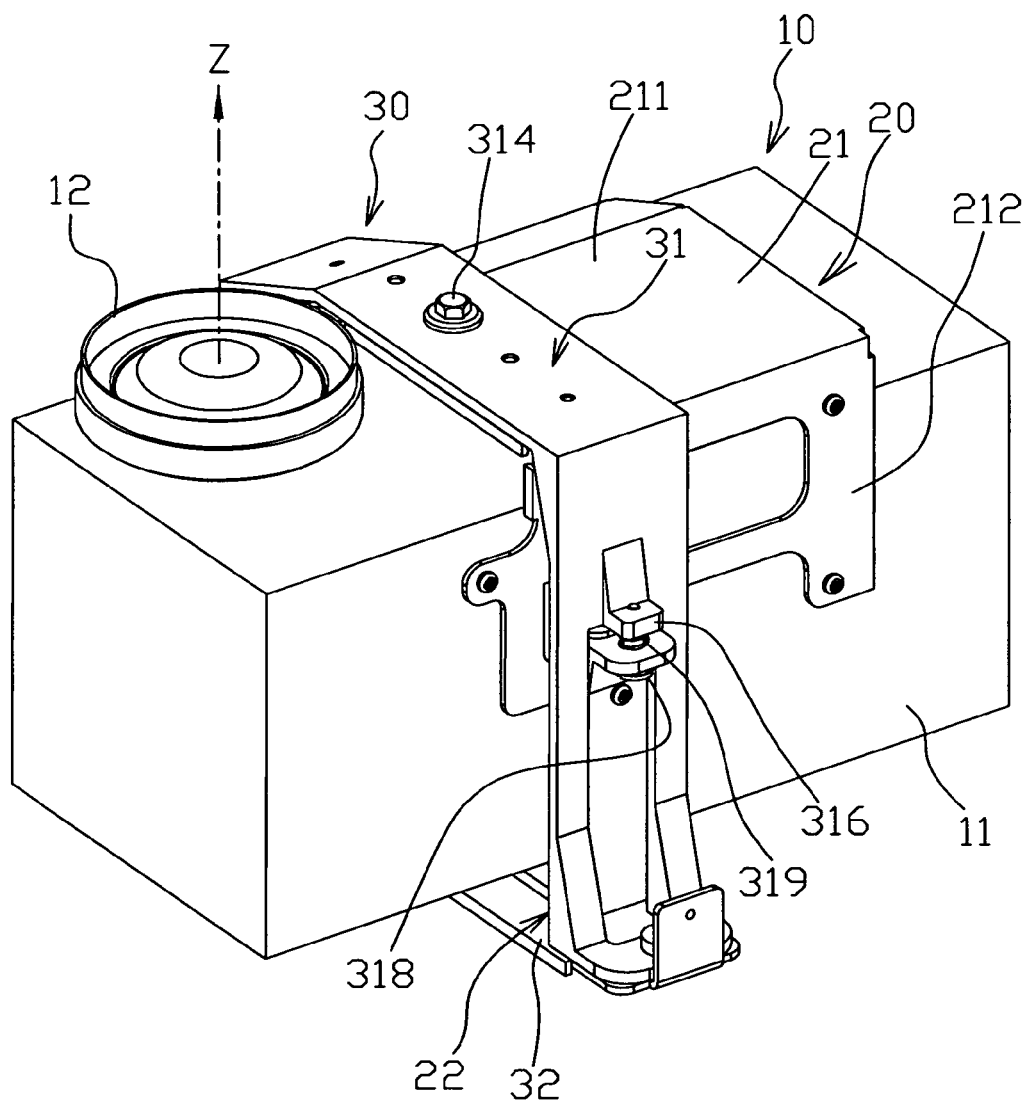
FIG. 2 is a schematic diagram showing an embodiment of a projection device according to the present invention.
Figure 3:
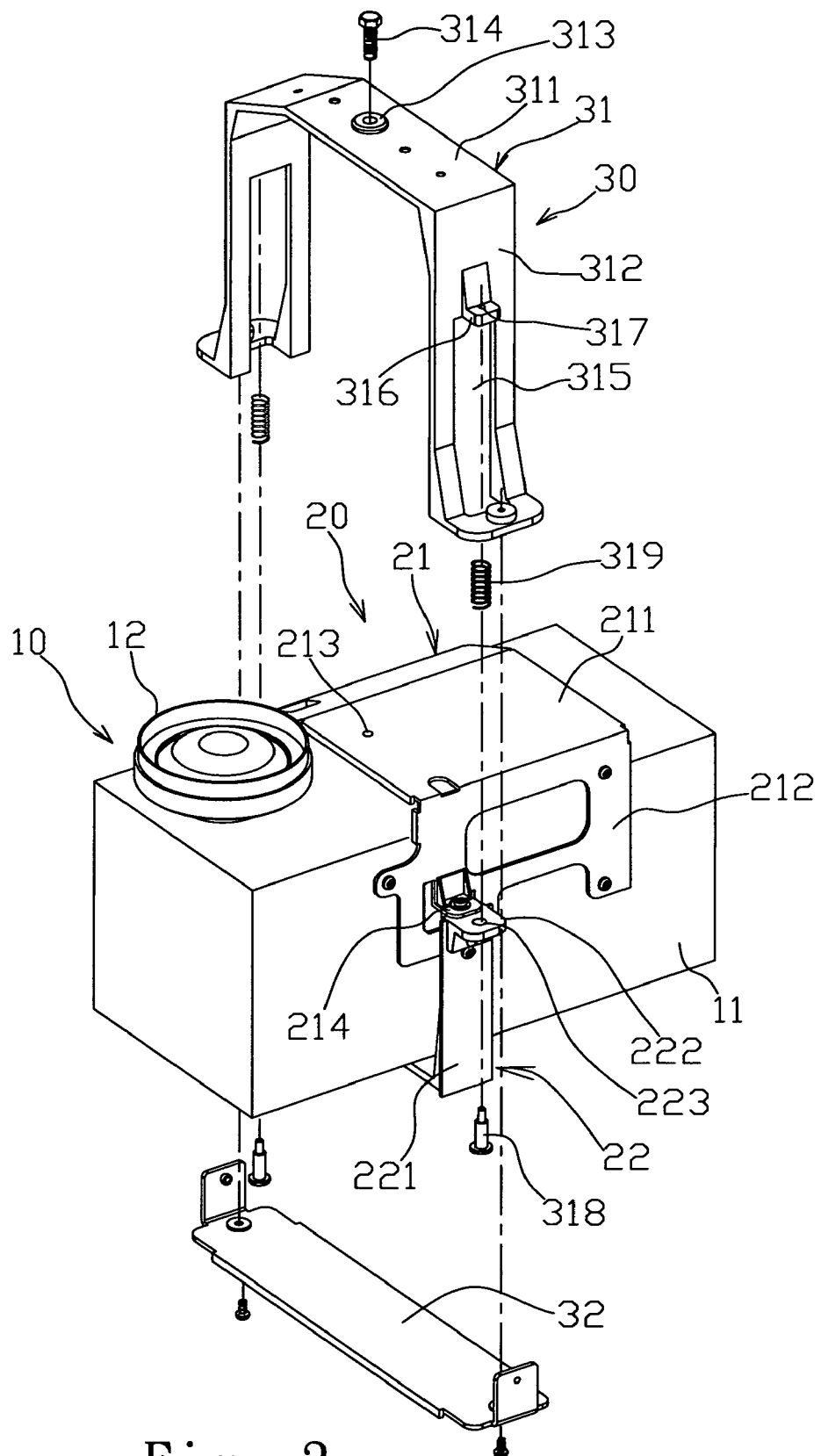
FIG. 3 is an exploded view of the projection device.
Figure 4:
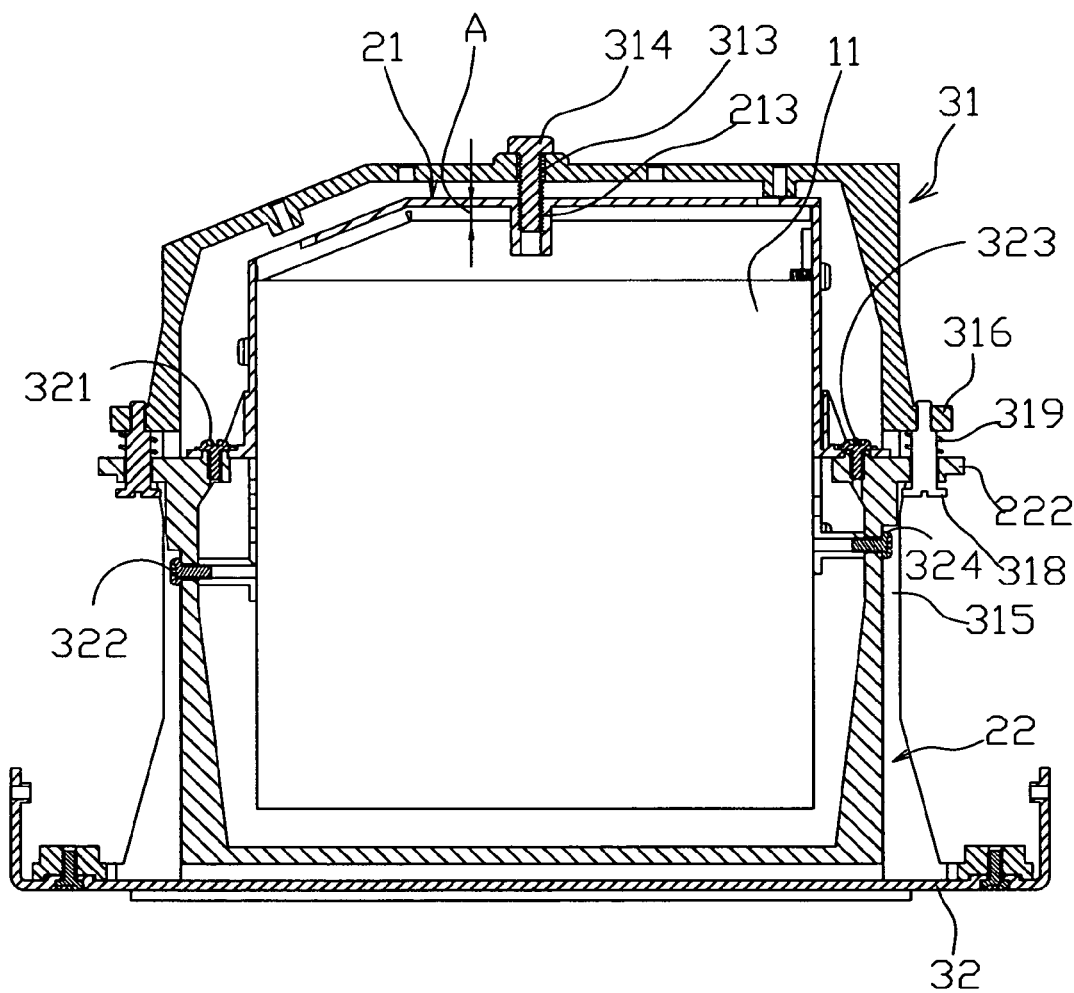
FIG. 4 is a cross-sectional view of the projection device.

Referring to FIG. 2, FIG. 3 and FIG. 4, a projection device comprises an optical engine device 10 and an adjusting device 30. The optical engine device 10 includes an optical engine 11 and fixing device 20. The optical engine 11 of the optical engine device 10 includes a projection lens 12. In the embodiment, the projection direction of the projection lens 12 is defined as the z-axis, and the projection lens 12 is operative to perform focal-length adjustment along the z-axis. The fixing device 20 is mounted on the optical engine 11. The fixing device 20 includes a fixing frame 21 and a fixing base 22. The fixing frame 21 is permanently mounted to or threaded with the optical engine 11. The fixing frame 21, for example, includes a first fixing section 211 perpendicular to the Z-axis and two second fixing sections 212 adjacent to the first fixing section 211. The second fixing sections 212 are opposite to each other. The first fixing section 211 has a first thread hole 213 formed on the fixing frame 21. The first fixing section 211 of the fixing frame 21 is spaced from the optical engine 11 by a predetermined distance A. The fixing frame 21 is a U-shape frame. One fixing lug 214 is formed to protrude from each of the fixing sections 212, for example. Each of the fixing sections 212 of the fixing frame 21 has the fixing lug 214. The fixing base 22 is preferably in the form of a U-shape base to fix the optical engine 11. The fixing base 22 includes a fixing plate 222 coupled to the corresponding fixing lug 214 by a fastener such as a screw or a rivet to fix the fixing frame 21 and the fixing base 22. Additional fitting mechanism such as screws 321, 322, 323, 324 as shown in FIG. 4 can also be used to ensure the proper positions of the fixing frame 21 and the fixing base 22 and to reinforce the connection. The fixing base 22 and the optical engine 11 are preferably spaced from each other by a distance. In addition, a pivotal hole 223 is formed in each fixing plate 222.

The adjusting device 30 includes an adjusting frame 31 and an adjusting base 32. The adjusting frame 31 includes a first adjusting surface 311 perpendicular to the Z-axis and two second adjusting surfaces 312 adjacent to the first adjusting surface 311. The adjusting frame 31 is a U-shape frame. The first adjusting surfaces 311 are opposite to each other. The first adjusting surface 311 has a second thread hole 313. An adjusting bolt 314 is screwing through the second thread hole 313 and the first thread hole 213 to form an adjustment mechanism. The optical engine device 10 is coupled to the adjusting frame 31, and the optical engine device 10 is moved relatively to the adjusting frame 31 along the direction of the axis of the adjusting bolt, such as Z-axis. In the embodiment, the axis of the adjusting bolt 314 is parallel to the projecting direction of the projection lens 12. Each of the second adjust surfaces 312 has a slot 315 and a stopping plate 316 disposed adjacent to the slot 315. The fixing plate 222 is passed through the slot 315. The stopping plate 316 includes a positioning hole 317 formed therein. A pin 318 is adapted to couple the fixing plate 222 to the stopping plate 316 through the pivotal hole 223 and the positioning hole 317. A spring 319 is sleeved on the pin 318 against the stopping plate 316 and the fixing plate 222, while the fixing plate is located at the slot 315 of the adjusting frame 31. In other words, the fixing device 20 pivots to the adjusting frame 31. Further, the adjusting seat 32 is coupled to the adjusting frame 31 by fasteners such as screws or rivets. The adjusting base 32 is preferably fitted on a frame (not shown). After assembly, an appropriate space between the adjusting base 32 and the fixing plate 222 is maintained.

Figure 5:
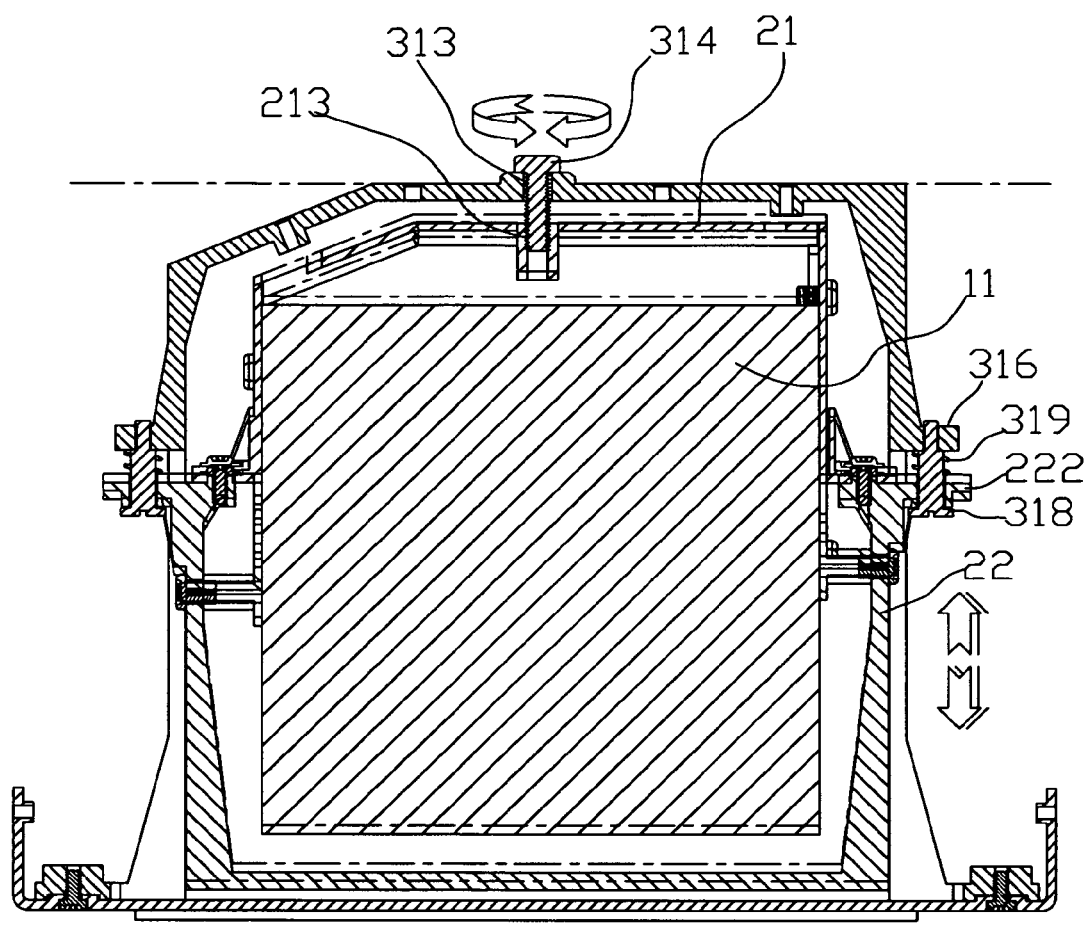
FIG. 5 is another cross-sectional view of the projection device while adjusting the optical engine device.
Figure 6:
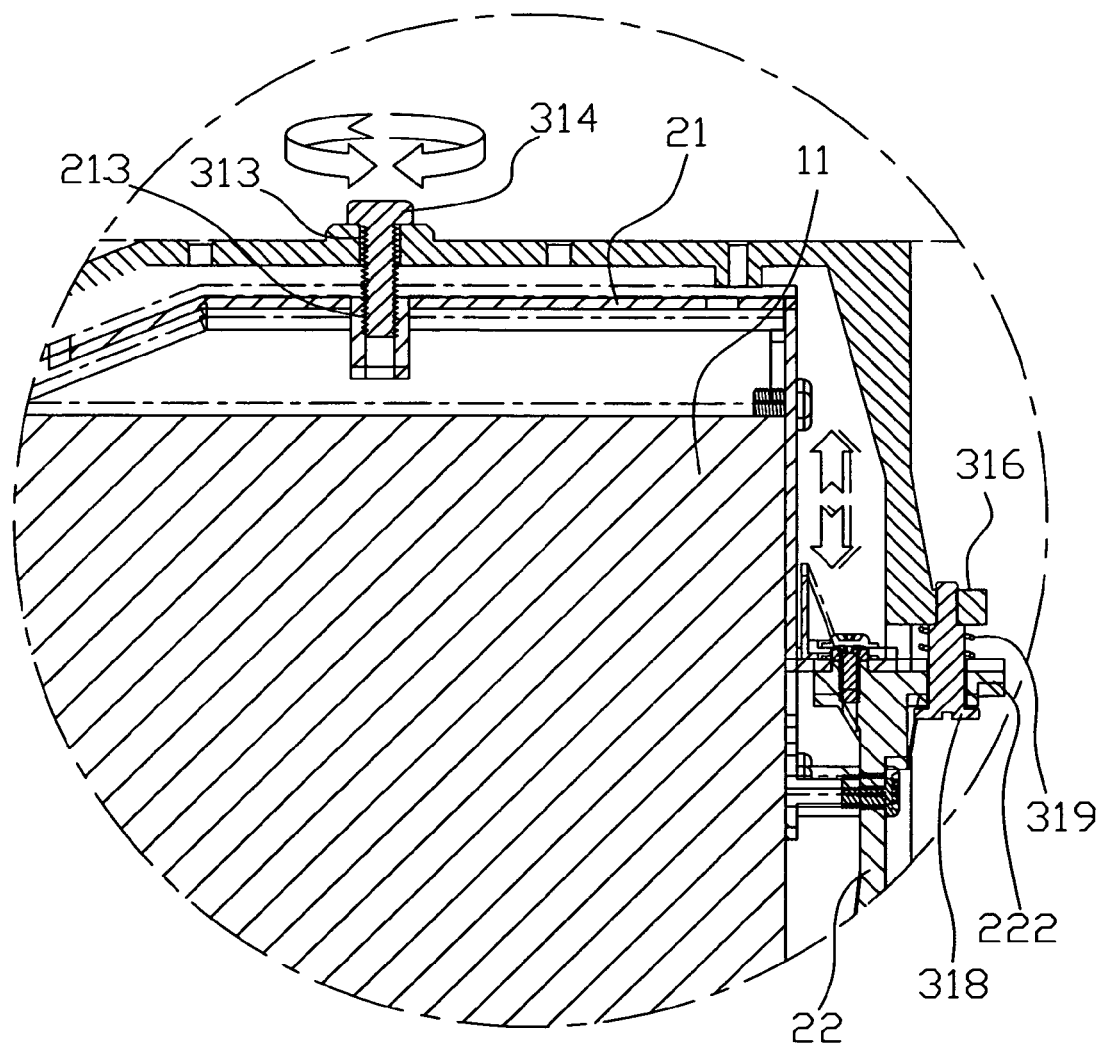
FIG. 6 is a partial cross-sectional view of the projection device in assemblage.

Referring to FIG. 5 and FIG. 6, by turning the adjusting bolt 314, the fixing frame 21 are moved upward or downward to cause the optical engine 11 and the fixing base 22 moving upward or downward. The focal length of the projection lens 12 is then adjusted by the upward and downward movement of the optical engine 11 and fixing base 22.

When the optical engine 11 is moved upward or downward, the spring 319 is compressed or stretched as a buffer of the operation of the adjusting bolt 314. The spring 319 also serves to offset the spacing between the first and second thread holes 213 and 313 to achieve a high-precision adjustment of the focal length. When the optical engine 11 is moved backward, the lower end of the pin 318 approaches the fixing plate 22 to serve as a terminal point which ultimately limits the range of adjustment.

It is worth noting that the assembly of the adjusting bolt 314, the first thread holes 213 of the fixing frame 21, and the second thread hole 313 of the adjusting frame 31 along the Z-axis provides the focal length adjustment of the optical engine 11. When the assembly is performed along another direction, such as the X-axis or the Y-axis, adjustment along the other direction can also be performed by adjusting the optical engine 11 to a proper position.

Accordingly, the projection device as described in the embodiment provides the function of focal-length adjustment of the optical engine along the Z-axis during assembly. Therefore, the deviation of focal length from the design value caused by mechanical errors, assembly errors, optical errors or transportation factors can be prevented. The image quality of projection devices is greatly enhanced. In addition, the operation of the present invention is very convenient and fast. The projection device is indeed a superior, high-efficacy, and high-utility design.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection device, comprising:
   an optical engine device having at a first thread hole and a projection lens;
   wherein the optical engine device comprises:
      an optical engine; and
      a fixing device mounted to the optical engine, the fixing device comprising a fixing frame, the first thread hole being formed on the fixing frame; and
   an adjusting device, comprising:
      an adjusting frame, having a second thread hole; and
      an adjusting bolt inserted through the first thread hole and the second thread hole by screwing,
   wherein the optical engine device is coupled to the adjusting frame, and the optical engine device is moved relatively to the adjusting frame along the direction of the axis of the adjusting bolt.

2. The projection device according to claim 1, wherein the axis of the adjusting bolt is parallel to the projecting direction of the projection lens.

3. The projection device according to claim 1, wherein the fixing frame is spaced from the optical engine by a predetermined distance, and the fixing device comprises a fixing base coupled to the fixing frame.

4. The projection device according to claim 3, wherein the fixing frame includes two fixing lugs, and the fixing base includes two fixing plates respectively coupled to the corresponding fixing lugs.

5. The projection device according to claim 4, wherein the adjusting frame further comprises:
   a slot, the fixing plate passing through the slot;
   a stopping plate disposed adjacent to the slot, the stopping plate including a positioning hole formed therein;
   a pin adapted to couple the fixing plate to the stopping plate through the positioning hole; and
   a spring sleeved on the pin being against the stopping plate and the fixing plate.

6. The projection device according to claim 4, wherein the fixing frame is a U-shape frame.

7. The projection device according to claim 4, wherein the fixing base is a U-shape base.

8. The projection device according to claim 1, wherein the adjusting device further comprises an adjusting base coupled to the adjusting frame.

9. The projection device according to claim 8, wherein the adjusting base coupled to the adjusting frame by at least one fastener.

10. The projection device according to claim 1, wherein the adjusting frame is a U-shape frame.

* * * * *